(12) United States Patent
Sugawara

(10) Patent No.: US 11,310,437 B2
(45) Date of Patent: Apr. 19, 2022

(54) CONTROL APPARATUS, CONTROL METHOD, IMAGE CAPTURING APPARATUS, AND STORAGE MEDIUM

(71) Applicant: CANON KABUSHIKI KAISHA, Tokyo (JP)

(72) Inventor: Azusa Sugawara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/196,554

(22) Filed: Mar. 9, 2021

(65) Prior Publication Data
US 2021/0289121 A1 Sep. 16, 2021

(30) Foreign Application Priority Data
Mar. 10, 2020 (JP) .............................. JP2020-041220

(51) Int. Cl.
*H04N 5/235* (2006.01)
*H04N 5/225* (2006.01)

(52) U.S. Cl.
CPC ......... *H04N 5/2354* (2013.01); *H04N 5/2256* (2013.01)

(58) Field of Classification Search
CPC ............... H04N 5/2354; H04N 5/2256; H04N 5/23206; G03B 2206/00; G03B 3/10; G03B 15/05
See application file for complete search history.

(56) References Cited

U.S. PATENT DOCUMENTS

| 2010/0202767 A1 | 8/2010 | Shirakawa | |
|---|---|---|---|
| 2013/0222628 A1* | 8/2013 | Koike | H04N 5/2256 348/211.2 |
| 2019/0349505 A1* | 11/2019 | Tsuchiya | H04N 5/2256 |

FOREIGN PATENT DOCUMENTS

| JP | 2010-185961 A | 8/2010 |
|---|---|---|
| JP | 2015-219325 A | 12/2015 |

OTHER PUBLICATIONS

European Search Report dated Jul. 5, 2021, that issued in the corresponding European Patent Application No. 21157050.2.

* cited by examiner

*Primary Examiner* — Nelson D. Hernández Hernández
(74) *Attorney, Agent, or Firm* — Cowan, Liebowitz & Latman, P.C.

(57) ABSTRACT

A control apparatus that controls a strobe to fire in synchronization with an end of an exposure period of an image capturing apparatus, includes a wireless communication device that communicates wirelessly with the strobe, and a controller that controls the wireless communication device, and the wireless communication device periodically sends a signal for maintaining communication with the strobe during the exposure period of the image capturing apparatus.

12 Claims, 11 Drawing Sheets

REAR VIEW

OVERVIEW CROSS-SECTIONAL VIEW

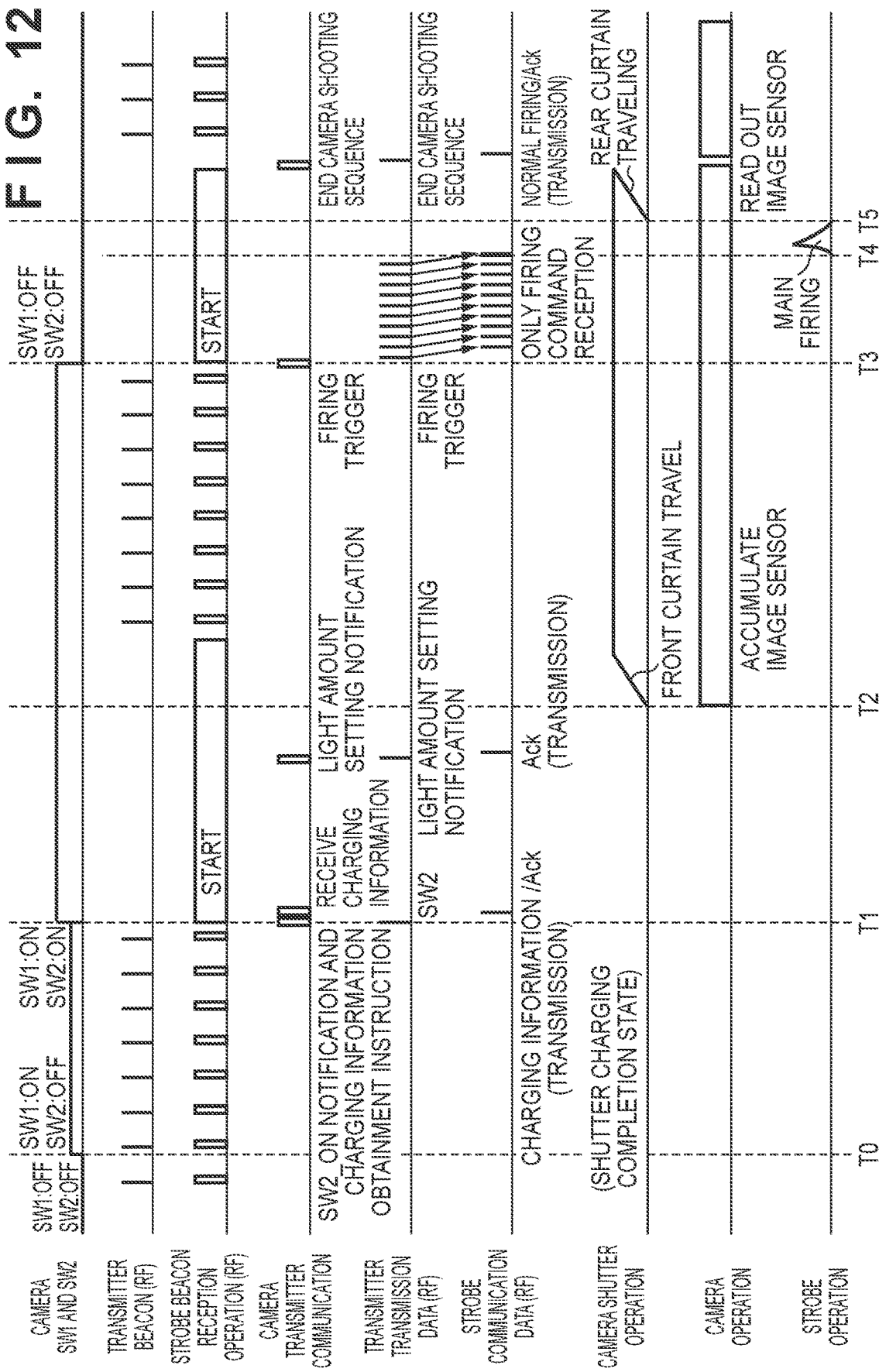

CONTROL APPARATUS, CONTROL METHOD, IMAGE CAPTURING APPARATUS, AND STORAGE MEDIUM

BACKGROUND OF THE INVENTION

Field of the Invention

The present invention relates to techniques for controlling strobes.

Description of the Related Art

Flash devices controlled through wireless communication with an image capturing apparatus (wireless strobes) have been known for some time. Wireless strobes have the advantage of being easier to install than strobes connected using wires. However, the lower reliability and greater latency than wired communication are issues that must be addressed.

Japanese Patent Laid-Open No. 2010-18561 discloses a technique in which the reliability of communication is ensured by sending timing information, which instructs the timing at which the strobe is to fire, multiple times from an image capturing apparatus to a wireless strobe. Furthermore, according to Japanese Patent Laid-Open No. 2010-18561, the timing of the firing is varied from timing information to timing information so that the wireless strobe fires at the same timing regardless of which of the timing information sent multiple times the firing is based upon.

If the shutter speed or exposure period is determined prior to shooting, the strobe can be fired in synchronization with the shutter release using the method disclosed in Japanese Patent Laid-Open No. 2010-18561 by instructing the firing timing in accordance with delay taken by communication, the timing of shutter operations, and the like. The method disclosed in Japanese Patent Laid-Open No. 2010-185961 can implement front curtain synchronous firing control, in which the strobe is caused to fire immediately after the front curtain fully opens, and rear curtain synchronous firing control, in which the strobe is caused to fire immediately before the rear curtain closes, in a focal plane shutter or electronic shutter combination.

However, in rear curtain synchronous firing control realized through radio wave control, operations from the start of the firing sequence to the end of the firing are linked to the timing at which the rear curtain of the shutter closes. Accordingly, after a long exposure, the communication link between the communication device and the wireless strobe may be lost between the start of the exposure and the time when the strobe fires immediately before the rear curtain closes, and it therefore may not be possible to cause the wireless strobe to fire synchronously with the rear curtain.

Specifically, the communication device must instruct the wireless strobe to obtain charge completion information, communicate a light amount setting, and set a firing trigger for the wireless strobe without any skew, in a period from when a signal for the image capturing apparatus to start shooting is made to when the wireless strobe stops firing. The issuing of beacon packets is therefore stopped.

A "beacon" is a signal that ensures communication between a communication device and a wireless strobe, and normally, a link is maintained by the sending-side communication device issuing a beacon packet periodically. e.g., every one second, and the wireless strobe receiving the beacon packets. The wireless strobe is designed so that the link is cut if a beacon is not received within a predetermined amount of time, e.g., five seconds. As such, with long exposure times such as times over five seconds, the link will be cut and the wireless strobe will be unable to fire synchronously with the rear curtain.

SUMMARY OF THE INVENTION

Having been achieved in light of the foregoing issue, the present invention improves the reliability of firing control when controlling a strobe wirelessly.

According to a first aspect of the present invention, there is provided a control apparatus that controls a strobe to fire in synchronization with an end of an exposure period of an image capturing apparatus, the control apparatus comprising: a wireless communication device that communicates wirelessly with the strobe; and a controller that controls the wireless communication device, wherein the wireless communication device periodically sends a signal for maintaining communication with the strobe during the exposure period of the image capturing apparatus.

According to a second aspect of the present invention, there is provided an image capturing apparatus comprising a control apparatus that controls a strobe to fire in synchronization with an end of an exposure period of an image capturing apparatus, wherein the control apparatus comprises: a wireless communication device that communicates wirelessly with the strobe; and a controller that controls the wireless communication device, wherein the wireless communication device periodically sends a signal for maintaining communication with the strobe during the exposure period of the image capturing apparatus.

According to a third aspect of the present invention, there is provided a control method of controlling a strobe to fire in synchronization with an end of an exposure period of an image capturing apparatus, the method comprising: communicating wirelessly with the strobe; and controlling the wireless communication, wherein in the wireless communication, a signal for maintaining communication with the strobe is periodically sent during the exposure period of the image capturing apparatus.

According to a fourth aspect of the present invention, there is provided a computer-readable storage medium in which is stored a program that causes a computer to execute a control method of controlling a strobe to fire in synchronization with an end of an exposure period of an image capturing apparatus, the method comprising: communicating wirelessly with the strobe; and controlling the wireless communication, wherein in the wireless communication, a signal for maintaining communication with the strobe is periodically sent during the exposure period of the image capturing apparatus.

Further features of the present invention will become apparent from the following description of exemplary embodiments with reference to the attached drawings.

BRIEF DESCRIPTION OF THE DRAWINGS

FIG. 12 is a timing chart corresponding to the flowcharts in FIG. 11.

DESCRIPTION OF THE EMBODIMENTS

Figure 1:
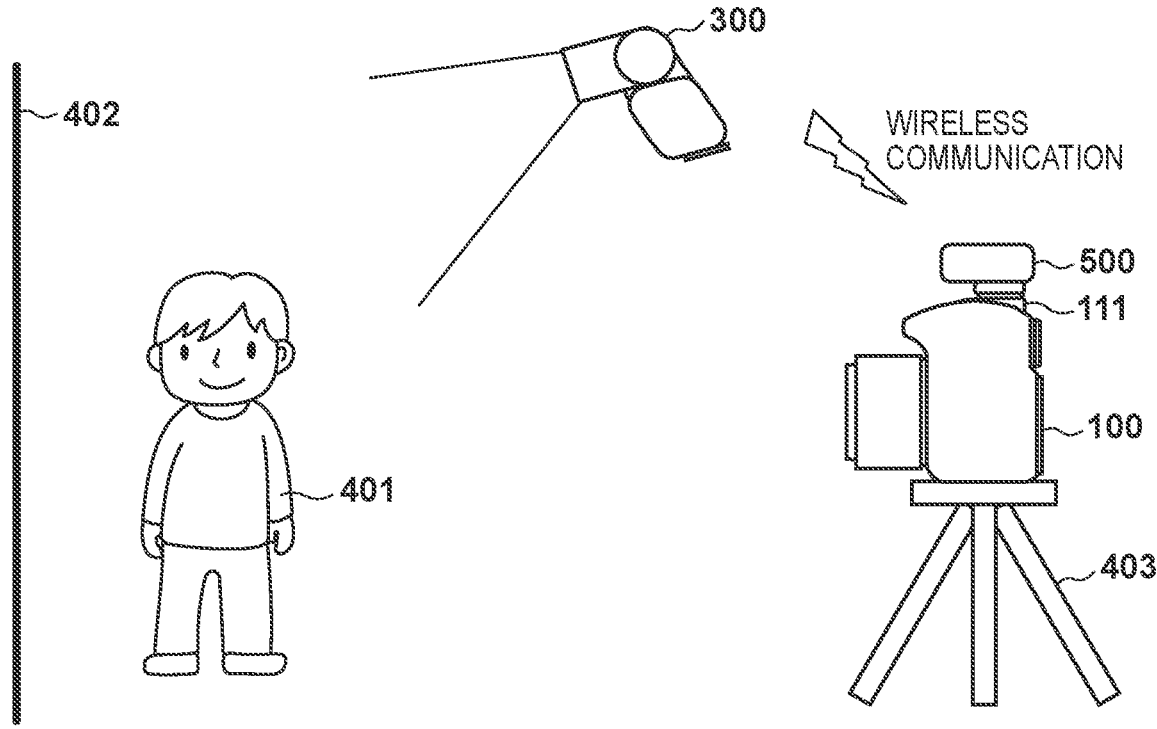
FIG. 1 is a schematic diagram illustrating a strobe control camera system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic diagram illustrating a strobe control camera system according to a first embodiment of the present invention. The strobe control camera system according to the present embodiment is a wireless strobe system constituted by a digital single-lens reflex camera (called simply a "camera" hereinafter) 100, a communication device (called a "transmitter" hereinafter) 500 connected directly to the camera 100, and a strobe ("flash device") 300 independent from the camera 100.

The transmitter 500, which is connected directly to an external accessory attachment part 111 of the camera 100, is capable of communicating with the camera 100 via the external accessory attachment part 111, and incorporates a wireless communication circuit and a wireless antenna. The strobe 300, which is independent from the camera 100, also incorporates a wireless communication circuit and a wireless antenna, like the transmitter 500. The transmitter 500 and the strobe 300 communicate wirelessly through a known wireless communication standard, such as IEEE 802.15.4.

FIG. 1 assumes shooting using a strobe in a photography studio, and illustrates the camera 100 being held in place by a tripod 403 with respect to a subject 401 and a screen 402. In the present embodiment, the transmitter 500 connected to the camera 100 serves as a master device and the strobe 300 independent from the camera 100 serves as a slave device, and a firing timing of the strobe 300 is synchronized with a shutter timing of the camera 100. Strobe-synchronized shooting is performed as a result.

Although the transmitter 500 connected to the camera 100 is described as the master in the present embodiment, it is also possible to use a strobe capable of wireless communication as the master instead of the transmitter 500. Alternatively, if the camera itself incorporates a wireless communication circuit and a wireless antenna, and is capable of wireless communication, the camera may serve as the master and send instructions directly to the strobe 300 through wireless communication.

Figure 2B:
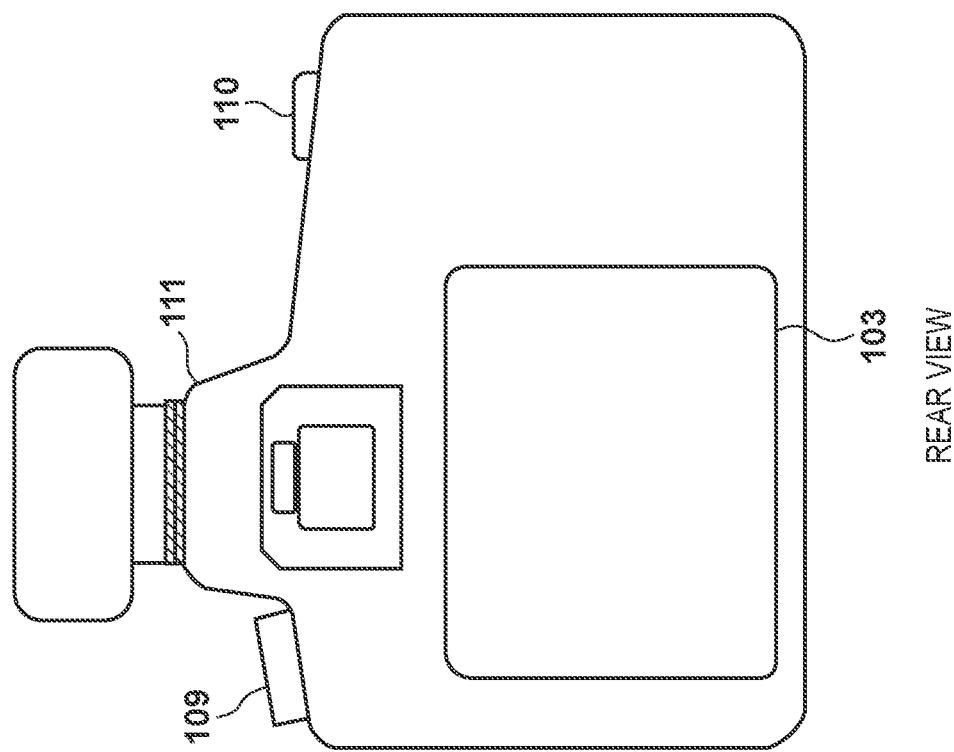
FIGS. 2A and 2B are a schematic vertical cross-sectional view and a rear view of a camera and a transmitter.
Figure 2A:
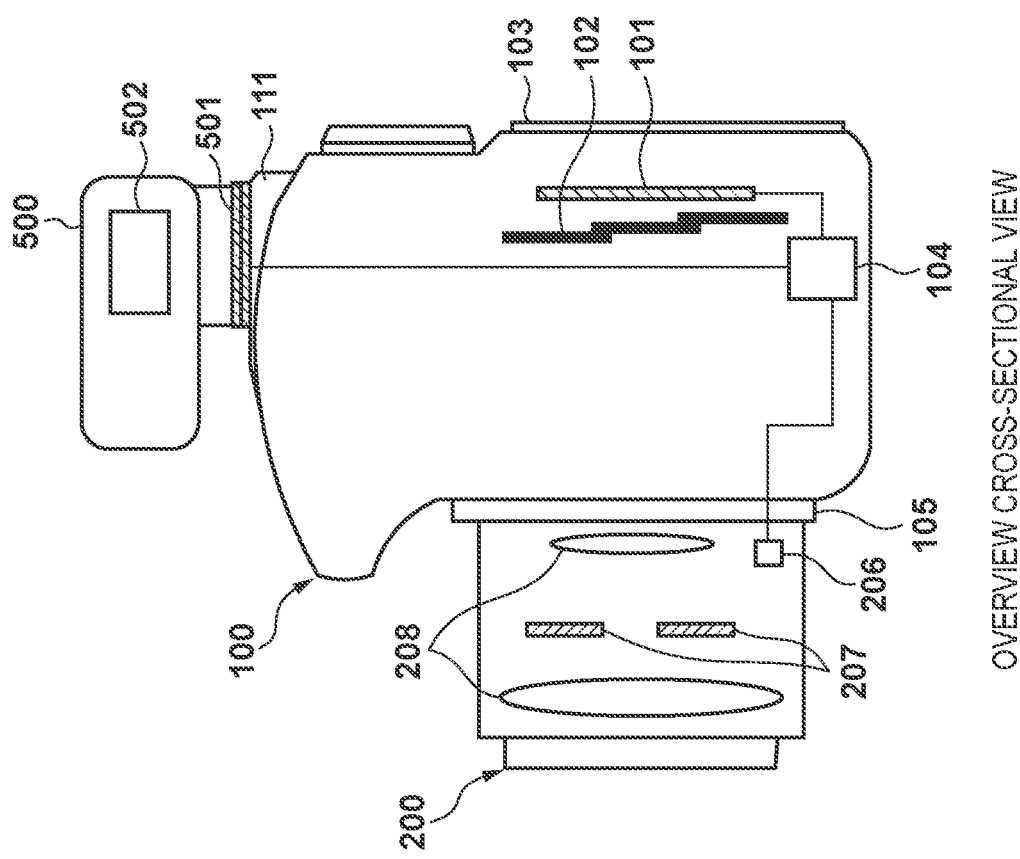

FIGS. 2A and 2B are a schematic vertical cross-sectional view (a vertical cross-sectional view including an optical axis) and a rear view of the camera 100 and the transmitter 500 according to the present embodiment. Note that of the configurations included in the camera 100, only the configurations required for describing the embodiment are illustrated in FIGS. 2A and 2B.

The camera 100 and a shooting lens 200 are connected by a mount 105, and the shooting lens 200 is an interchangeable lens which can be removed from the camera 100. The shooting lens 200 includes a lens group 208, and forms an optical image of a subject on an image capturing surface of an image sensor 101.

The image sensor 101 is a CMOS image sensor, for example, and has a plurality of photoelectric conversion elements arranged two-dimensionally. The image sensor 101 converts the optical image formed by the shooting lens 200 into an electrical signal (an image signal) using the plurality of photoelectric conversion elements. The amount of the electrical signal (a voltage value) relative to the same amount of light received can be changed by changing the sensitivity of the image sensor 101.

A shutter 102 is disposed in front of the image sensor 101, and includes a front curtain and a rear curtain that travel up and down. The front curtain will also be called a "first curtain" and the rear curtain will also be called a "second curtain". Assuming a state in which the optical path is blocked is "fully closed" and a state in which the optical path is open is "fully open", exposure of the image sensor 101 starts when, in a state where the rear curtain is fully open and the front curtain is fully closed, the front curtain travels in a direction that opens the front curtain. Then, when the rear curtain is fully closed after a predetermined amount of time has passed, the exposure of the image sensor 101 ends. As the exposure time shortens, the rear curtain begins traveling before the front curtain becomes fully open, and the image sensor 101 is exposed through a slit-shaped opening formed between the front curtain and the rear curtain.

A camera microcomputer 104 includes, for example, a programmable processor and memory, and controls operations of the camera 100, the shooting lens 200, and external accessories by loading programs stored in non-volatile memory into system memory and executing the programs.

A lens control unit 206 of the shooting lens 200 includes, for example, a programmable processor and memory, and controls operations of the shooting lens 200 by loading programs stored in non-volatile memory into system memory and executing the programs. Operations of the shooting lens 200 include driving an aperture stop 207, driving a mobile lens included in the lens group 208, and the like. A focus lens, a magnification lens, and the like are included in the mobile lens. The lens control unit 206 can communicate with the camera microcomputer 104 through the mount 105, and controls operations of the shooting lens 200 in response to instructions, requests, and the like from the camera microcomputer 104, sends information of the shooting lens 200 to the camera microcomputer 104, and so on.

The camera microcomputer 104 can execute automatic exposure control ("AE" hereinafter) for determining exposure control values (aperture value, shutter speed, shooting sensitivity) on the basis of brightness information of an image shot by the image sensor 101, for example. The camera microcomputer 104 can also execute automatic focus adjustment ("AF" hereinafter) for controlling the focal distance of the shooting lens 200 so as to focus on a predetermined area within a shooting range, on the basis of contrast information of the image shot using the image sensor 101.

Note that the configuration is not limited to one in which the camera microcomputer 104 implements the AE and AF, and any publicly known configuration can be used, such as a configuration in which an AE sensor, an AF sensor, and the like are used.

A display unit 103 is constituted by a liquid crystal display, an organic EL display, or the like, and displays images shot using the image sensor 101, information about the camera 100 (various types of setting values, remaining battery power, a number of shots that can be recorded, and the like), displays a GUI, and so on. The display unit 103 may be a touch screen.

A mode selection unit 109 is an operating member for selecting a shooting mode of the camera 100. "Shooting mode" refers to modes having different methods for setting the exposure control values, and includes an aperture priority mode, a shutter speed priority mode, a program mode, and an auto mode. The modes may also include a shooting mode for setting exposure control values appropriate for a specific subject or situation, such as shooting a moving body, shooting a person, or the like.

A shooting instruction unit ("shutter button" hereinafter) 110 includes a switch (release switch) SW1 which turns on in a half-pressed state, and a switch (release switch) SW2 which turns on in a fully-pressed state. The camera microcomputer 104 recognizes the half-pressed state (the switch SW1 being on) as a shooting preparation instruction, and recognizes the fully-pressed state (the switch SW2 being on) as a shooting start instruction. Upon recognizing the shooting preparation instruction, the camera microcomputer 104 executes AE and AF. Additionally, upon recognizing the shooting start instruction, the camera microcomputer 104 starts still image shooting processing, which includes driving the shutter 102, controlling the lighting of a strobe, and the like.

Operating members of the camera 100, such as the mode selection unit 109 and the shutter button 110, are electrically connected to the camera microcomputer 104. The camera microcomputer 104 monitors the states of the operating members, and upon detecting a change in the state of an operating member, executes operations in response to the detection.

When a long exposure mode (bulb mode) is selected by the mode selection unit 109, the camera microcomputer 104 drives the shutter 102 upon recognizing the shooting start instruction, and exposes the image sensor 101 by setting the front curtain and the rear curtain to be fully open. The camera microcomputer 104 continues to expose the image sensor 101 while the shooting start instruction is continuously being recognized. Once the shooting start instruction is no longer recognized, the camera microcomputer 104 ends the exposure of the image sensor 101 by setting the front curtain and the rear curtain of the shutter 102 to be fully closed. In another shooting mode, the camera microcomputer 104 controls the exposure time of the image sensor 101 through automatic exposure control, or in accordance with a shutter speed set by a user.

The external accessory attachment part 111 is what is known as a "hot shoe", to which external accessories such as the transmitter 500, an external strobe, a microphone, and the like are mechanically and electrically connected. The external accessories attached to the external accessory attachment part 111, such as the transmitter 500 and the strobe 300, can communicate with the camera microcomputer 104, and the settings, operations, and the like of the external accessories can be controlled by the camera microcomputer 104.

A transmitter microcomputer 502 of the transmitter 500 includes, for example, a programmable processor and memory, and controls the operations of the transmitter 500 by loading programs stored in non-volatile memory into the system memory and executing the programs. By connecting to the external accessory attachment part 111 of the camera 100, a camera mounting part 501 of the transmitter 500 is mechanically and electrically connected to the camera 100, and the transmitter microcomputer 502 and the camera microcomputer 104 can communicate as a result.

Figure 3:
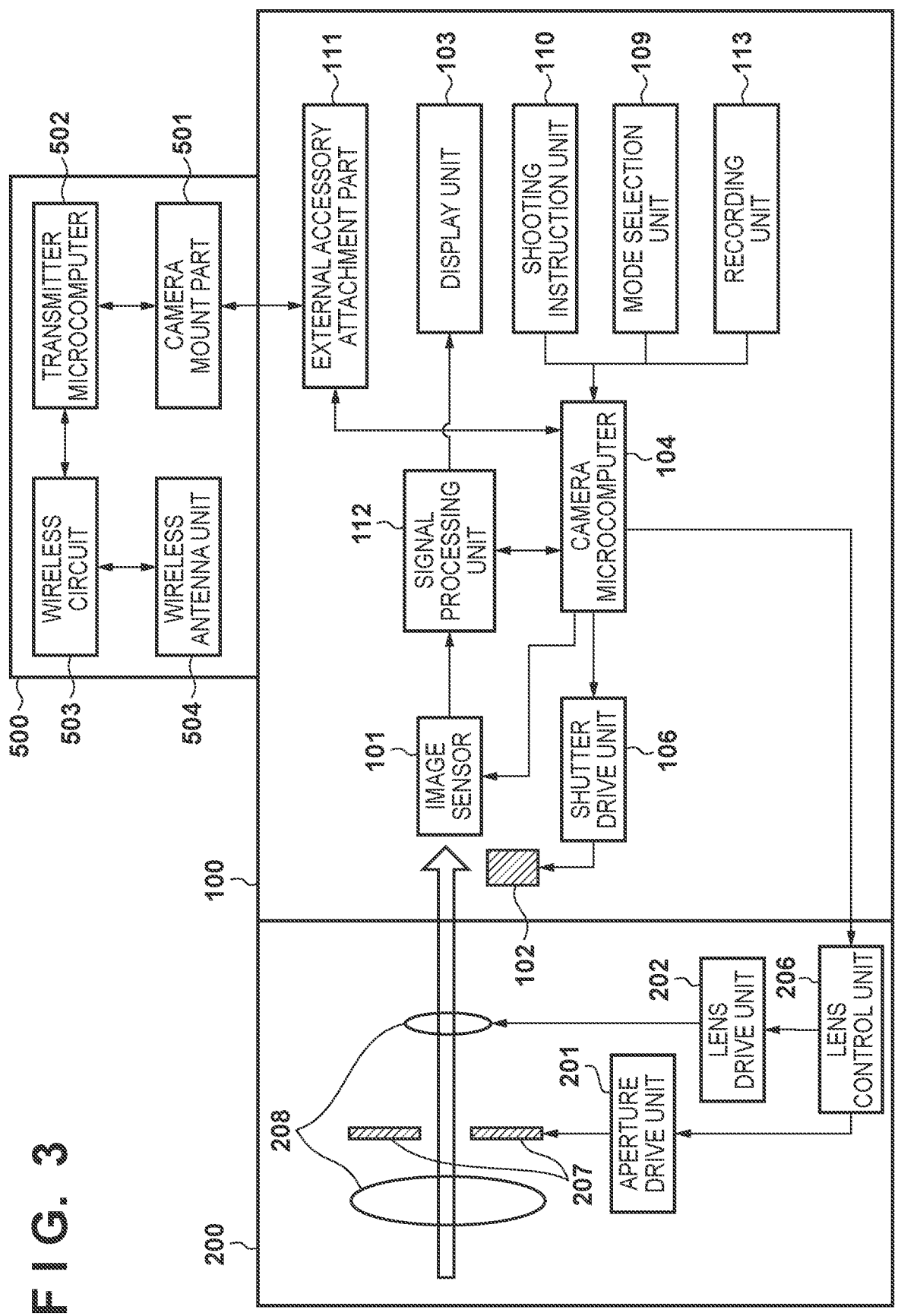
FIG. 3 is a block diagram illustrating an example of the functional configuration of the camera and transmitter illustrated in FIGS. 2A and 2B.

FIG. 3 is a block diagram illustrating an example of the functional configurations of the camera 100 and transmitter 500 illustrated in FIGS. 2A and 2B. Elements also illustrated in FIGS. 2A and 2B are given the same reference signs, and redundant descriptions will not be given.

In the shooting lens 200, an aperture drive unit 201 includes a motor, an actuator, and the like that drive the aperture stop 207 of the shooting lens 200, and adjusts the extent to which the aperture stop 207 opens by driving the aperture stop 207 under the control of the lens control unit 206.

A lens drive unit 202 includes a motor, an actuator, and the like that drive the mobile lens in the lens group 208 of the shooting lens 200, and adjusts the focal distance, focal length (angle of view), and so on of the shooting lens 200 by driving the mobile lens under the control of the lens control unit 206.

In the camera 100, a shutter drive unit 106 includes a motor, a spring, and the like that drive the front curtain and the rear curtain of the shutter 102, and executes shutter charging, causes the shutter curtains to travel, and so on under the control of the camera microcomputer 104.

A signal processing unit 112 applies various types of processing to the image signal output by the image sensor 101, including noise removal, white balance adjustment, color interpolation, various types of correction, resolution conversion, generating evaluation values used for AF and AE, and the like. The signal processing unit 112 generates an image signal for display and outputs that signal to the display unit 103, generates an image data file for recording and outputs that file to the camera microcomputer 104, and the like. The signal processing unit 112 also detects a predetermined region of the subject, such as a person's face, detects subject movement, and the like. Furthermore, the signal processing unit 112 encodes and decodes image data as needed.

A recording unit 113 is a memory card, for example, and the camera microcomputer 104 records the image data file for recording, obtained from the signal processing unit 112, in the recording unit 113. The recording format, the format of the image data file, and the like are determined in advance.

In the transmitter 500, a wireless circuit 503 performs wireless communication with the strobe 300 (described later) through a wireless antenna unit 504. The transmitter microcomputer 502 communicates with the camera microcomputer 104 through the external accessory attachment part 111. Firing timing of the strobe 300 is controlled on the basis of a firing timing instruction from the camera 100, through wireless communication performed by the wireless circuit 503 and the wireless antenna unit 504.

Figure 4:
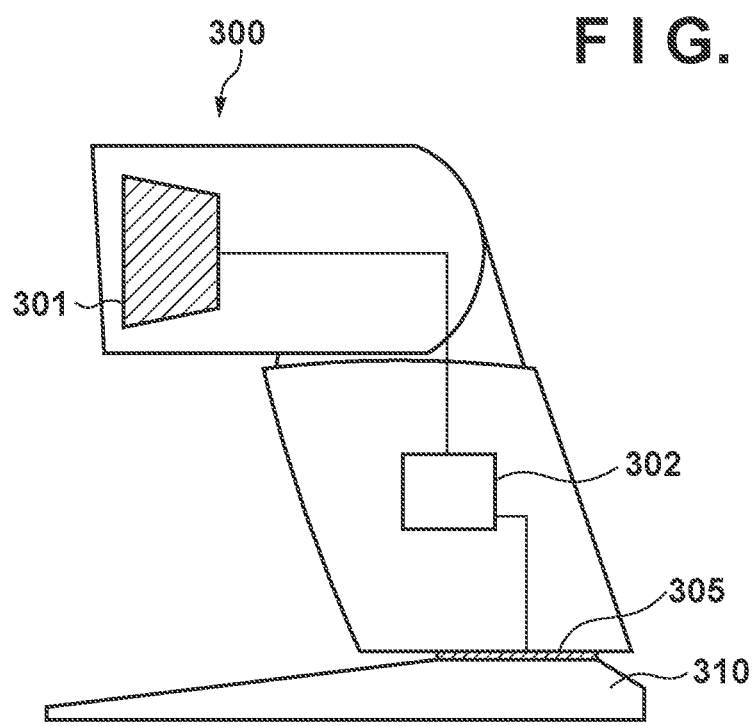
FIG. 4 is a schematic diagram illustrating the configuration of a wireless strobe.
Figure 5:
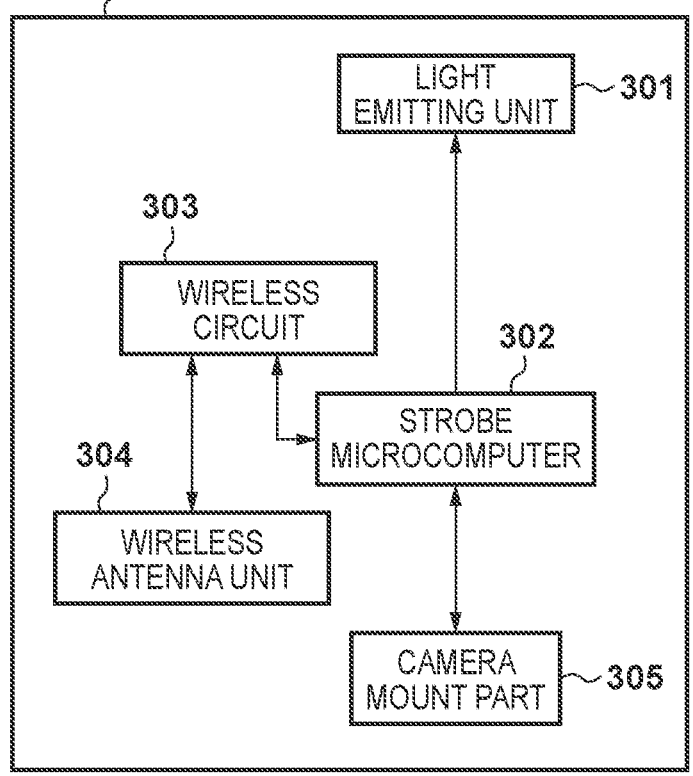
FIG. 5 is a block diagram illustrating the configuration of the wireless strobe.

FIG. 4 is a vertical cross-sectional view schematically illustrating an example of the configuration of the strobe 300, which can communicate wirelessly with the camera 100, and FIG. 5 is a block diagram schematically illustrating an example of the functional configuration of the strobe 300. In both drawings, only part of the configuration of the strobe 300 is illustrated.

A light emitting unit 301 includes a flash lamp, a capacitor, and the like, and emits light under the control of a strobe microcomputer 302. The strobe microcomputer 302 controls the firing timing, emitted light amount, and so on of the light emitting unit 301 on the basis of instructions from an external device, instructions made through operating members, and so on. A camera mounting part 305 is capable of mechanically and electrically connecting to the external accessory attachment part 111 of the camera 100. The strobe can communicate with the camera microcomputer 104 through the camera mounting part 305, and settings, operations, and the like of the strobe can be controlled by the camera microcomputer 104. A stand 310 is a support member for enabling the strobe 300 to stand on its own, and is configured to support the camera mounting part 305 of the strobe 300.

In FIG. 5, a wireless circuit 303 of the strobe 300 performs wireless communication with the transmitter 500 through a wireless antenna unit 304. The strobe microcomputer 302 receives information (instructions) for controlling the firing timing, the emitted light amount, and the like from the camera 100 through the wireless circuit 303, the wireless antenna unit 304, and the transmitter 500.

Although the method for wireless communication between the transmitter 500 and the strobe 300 is not particularly limited, radio wave-based wireless communication using the 2.4 GHz band is assumed to be used in the present embodiment. Operations of an image capturing system configured so that the camera 100, the transmitter 500, and the strobe 300 are capable of wireless communication will be described hereinafter.

Figure 6:
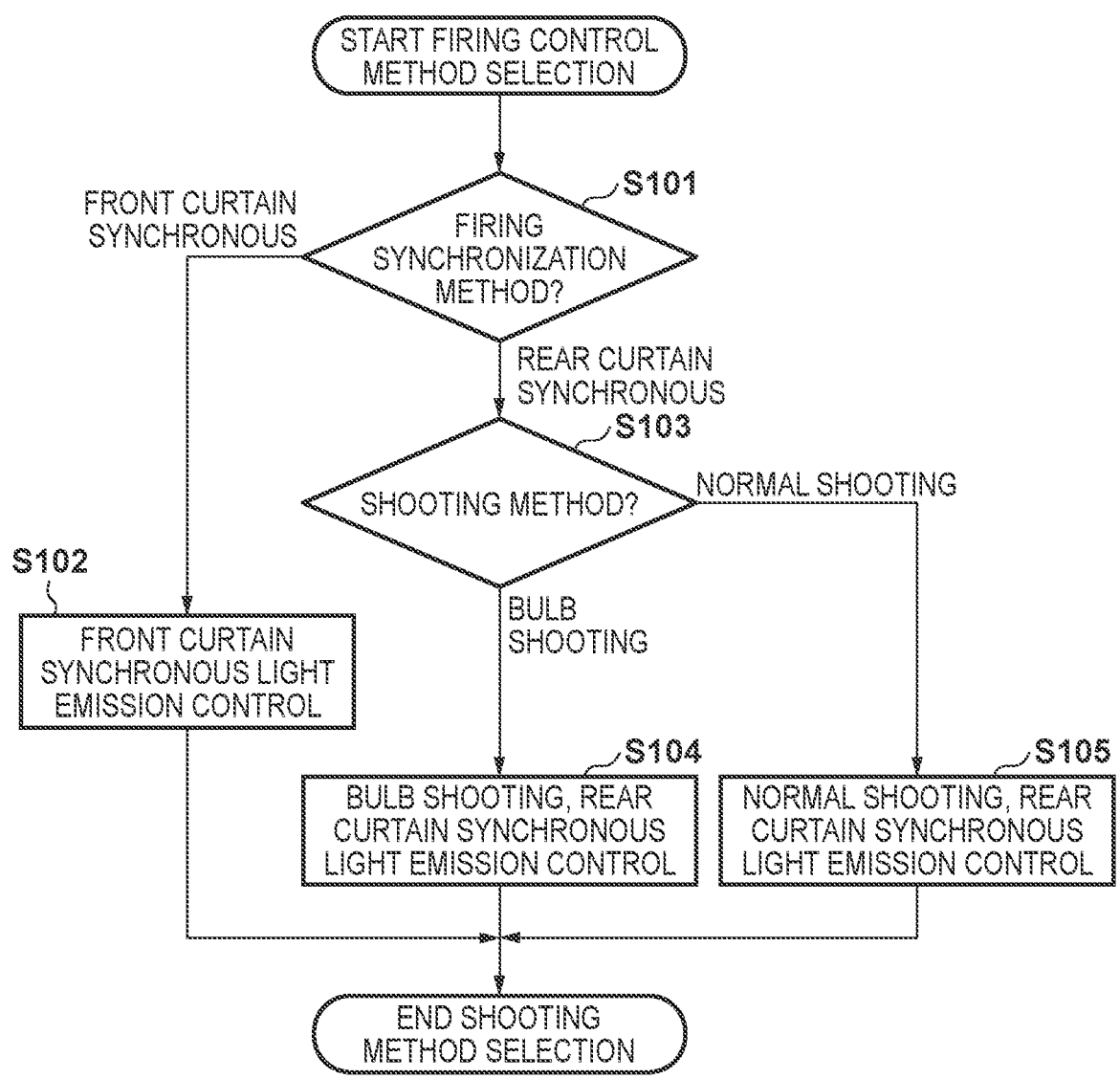
FIG. 6 is a flowchart illustrating firing control method selection processing.

FIG. 6 is a flowchart pertaining to firing control method selection processing performed by the camera microcomputer 104. This processing can be executed at any desired timing prior to recognizing the shooting start instruction.

In step S101, the camera microcomputer 104 determines whether to perform normal front curtain synchronous firing control or rear curtain synchronous firing control. "Front curtain synchronous firing control" is synchronous strobe firing control which causes the strobe to fire immediately after the shutter front curtain has become fully open. "Rear curtain synchronous firing control" is synchronous strobe firing control which causes the strobe to fire immediately before the shutter rear curtain travels. Which firing control is to be performed is assumed to be set in advance through user operations.

In the case of front curtain synchronous firing control, in step S102, front curtain synchronous shooting is registered in the camera microcomputer 104, and the selection of the firing control method ends.

When rear curtain synchronous firing control has been determined in step S101, the camera microcomputer 104 confirms the shooting method in step S103. Specifically, the camera microcomputer 104 confirms whether the shooting mode which is set is a bulb shooting mode, in which the shooting is performed with an indefinite exposure period, or as another shooting mode. Shooting modes aside from the bulb mode will be collectively called a "normal shooting mode".

In the case of bulb shooting, in step S104, bulb shooting and rear curtain synchronous firing control are registered in the camera microcomputer 104, and the shooting method selection then ends.

In the case of normal shooting, in step S105, rear curtain synchronous firing control in normal shooting is registered in the camera microcomputer 104, and the shooting method selection then ends.

Rear Curtain Synchronous Firing Control in Normal Shooting

Figure 7:
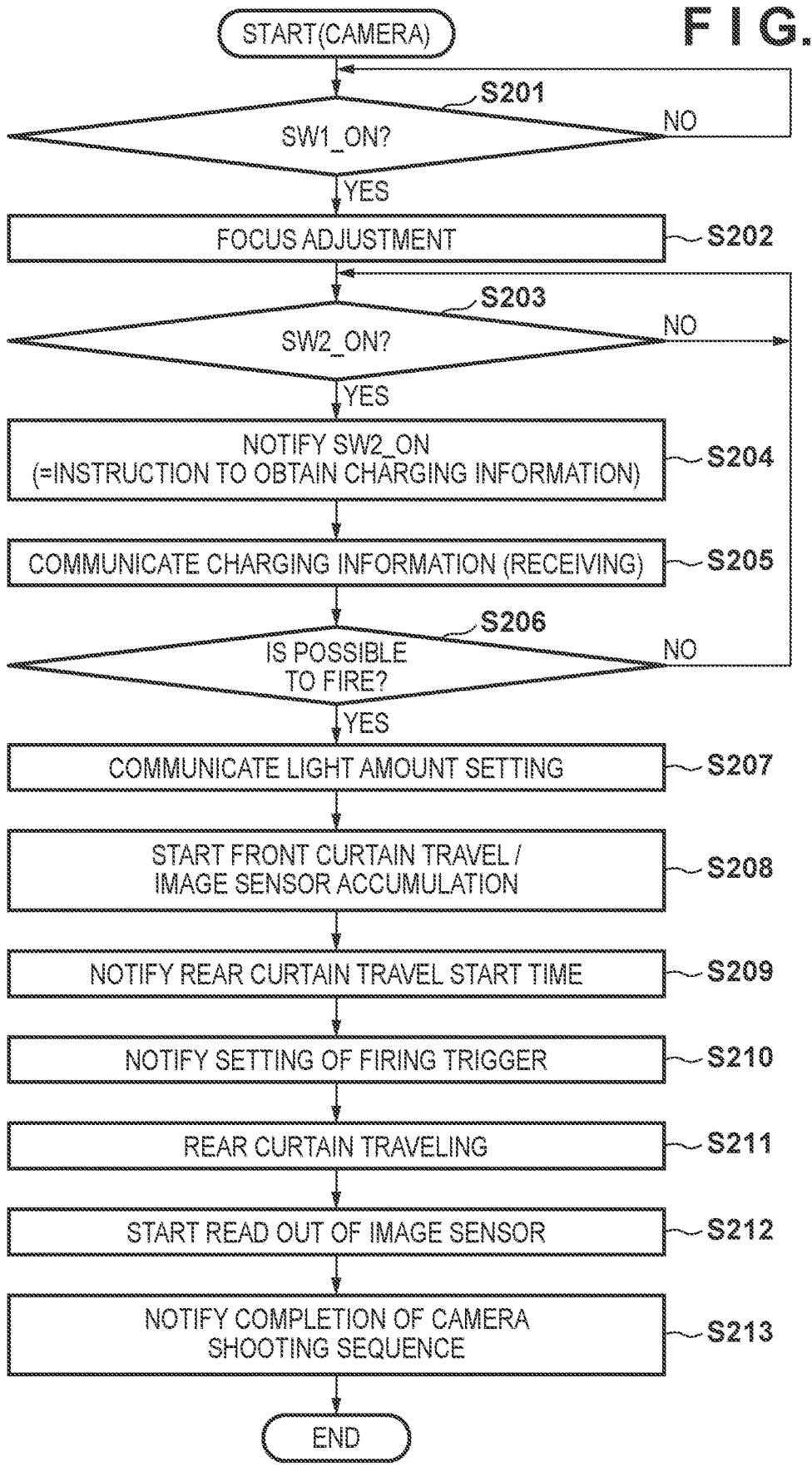
FIG. 7 is a flowchart illustrating rear curtain synchronous firing/shooting operations performed by the camera, according to the first embodiment.
Figure 8:
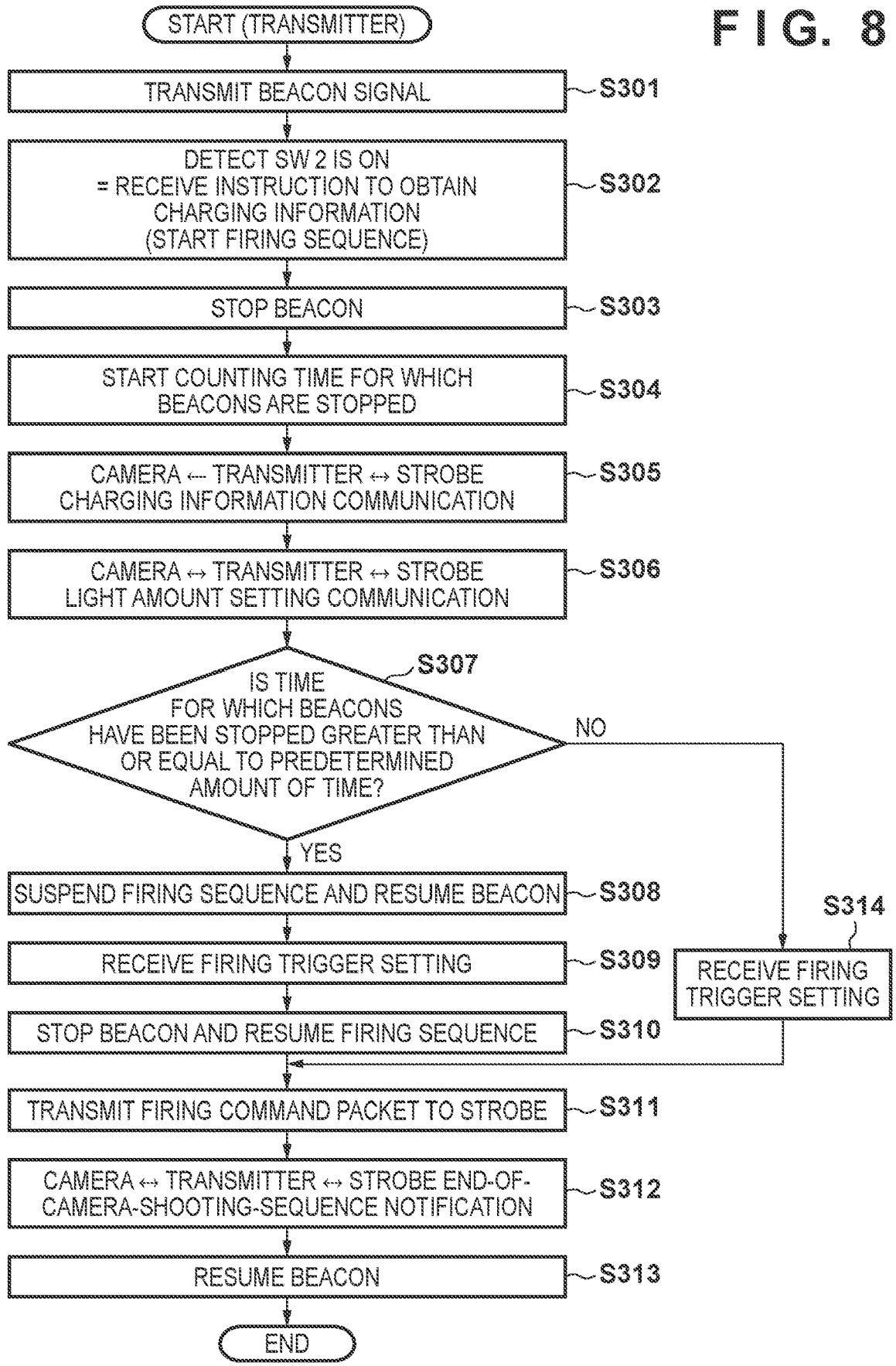
FIG. 8 is a flowchart illustrating rear curtain synchronous firing/shooting operations performed by the transmitter, according to the first embodiment.
Figure 9:
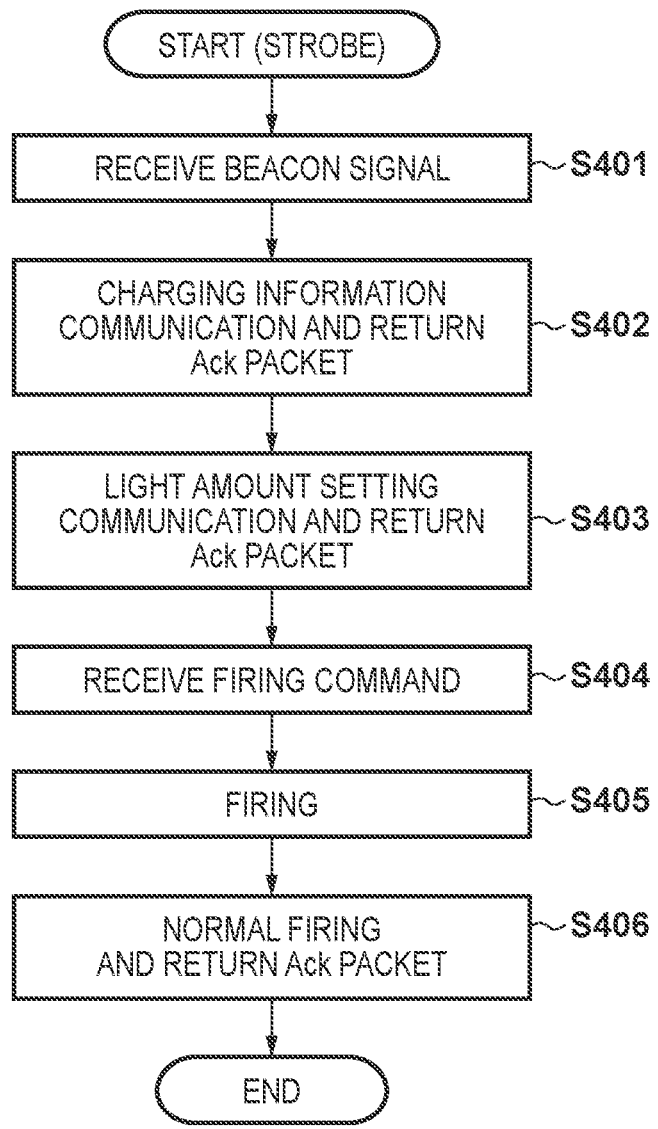
FIG. 9 is a flowchart illustrating rear curtain synchronous firing/shooting operations performed by a strobe, according to the first embodiment.

Operations performed when the shooting mode of the camera 100 is a mode that causes the strobe 300 to perform rear curtain synchronous firing in the normal mode (step S105) will be described next with reference to the flowchart in FIGS. 7 to 9. FIG. 7 illustrates operations performed by the camera 100, FIG. 8 illustrates operations performed by the transmitter 500, and FIG. 9 illustrates operations performed by the strobe 300.

To facilitate descriptions, the present embodiment assumes that a shutter speed Tv, an aperture value Av, an ISO sensitivity, and a strobe emitted light amount are all set to manual before shooting. However, these values may be determined using AE (automatic exposure) and a strobe automatic adjustment system.

Additionally, the present embodiment will describe strobe synchronized shooting in which the transmitter 500 and the strobe 300 connected to the camera 100 are in a one-to-one relationship, as illustrated in FIG. 1. It is furthermore assumed that the transmitter 500 and the strobe 300 are already registered with each other as communication partners through a known wireless pairing method.

When the transmitter 500 is powered on and is set to a strobe firing mode, the transmitter microcomputer 502 of the transmitter 500 controls the wireless circuit 503 to scan for channels across different wireless frequencies. Through this, the transmitter 500 searches for the strobe 300 to serve as a communication partner. When the strobe 300 is powered on, the strobe 300 controls the wireless circuit 303 in the same manner as the transmitter 500, sets a channel to be used, and enters a state of being able to respond to the search performed by the transmitter 500.

When the transmitter 500 discovers the strobe 300 through the search, the transmitter 500 serves as a network coordinator and establishes a network by starting the periodic issuance of beacon packets (beacon signals). The strobe 300 acts as a network device, establishing a link with the transmitter 500 as a communication partner so as to be capable of communication at any time.

Operations of the camera 100 performed after a wireless communication system constituted by the transmitter 500 and the strobe 300 has been started in this manner will be described with reference to the flowchart in FIG. 7.

In step S201, the camera 100 enters a state of standing by for a release operation made by the user (a switch SW1 on standby state).

When the switch SW1 turns on in step S201, focus adjustment operations begin in step S202, and in step S203, the camera stands by for the switch SW2 to turn on.

In step S203, the camera microcomputer 104 determines whether or not the switch SW2 has turned on in response to a user operation. When the switch SW2 turns on, in step S204, the transmitter 500 is notified that the switch SW2 has turned on through a connection unit constituted by the external accessory attachment part 111 of the camera 100 and the camera mounting part 501 of the transmitter 500. The notification that the switch SW2 has turned on simultaneously serves as a trigger for instructing the transmitter 500 to obtain charging information, which indicates a charging state of the strobe 300, through wireless communication between the transmitter 500 and the strobe 300.

In step S205, the camera 100 receives the charging information, indicating the charging state of the strobe 300, through the transmitter 500. Then, in step S206, it is determined whether or not the strobe can fire.

When it is determined in step S206 that the strobe can fire, in step S207, the camera 100 performs communication for setting a pre-set emitted light amount in the strobe 300 through the transmitter 500, under the control of the camera microcomputer 104. Having received the emitted light amount setting, the strobe 300 returns an Ack (acknowledgment) packet for acknowledging the reception, and the camera 100 receives that packet through the transmitter 500. If it is determined in step S206 that the strobe cannot fire, the sequence returns to step S203, where the camera once again stands by for the switch SW2 to turn on.

Next, in step S208, under the control of the camera microcomputer 104, the camera 100 controls the aperture stop 207 to cause the front curtain of the shutter 102 to begin traveling, and controls the image sensor 101 to begin accumulation.

In step S209, under the control of the camera microcomputer 104, the camera 100 makes a notification of a rear curtain travel start time of the shutter 102. The timing of the notification is immediately before the rear curtain travels. Specifically, the processing time is calculated by taking into account the shutter speed Tv value set before the start of shooting, the processing time of the firmware in the camera, and the time from when a firing instruction is made by the camera to when the firing of the strobe 300 ends, and the timing of the notification is set to be greater than or equal to an amount of time equivalent to this processing time prior to the start of the rear curtain travel.

In step S210, under the control of the camera microcomputer 104, the camera 100 notifies the transmitter 500 that a firing trigger is to be set. Operations performed in the period from when the transmitter 500 receives the firing trigger setting notification to when the strobe 300 fires will be described in detail later with reference to FIGS. 8 and 9, but the strobe 300 fires starting at the firing trigger setting notification (firing trigger signal) made in step S210.

After the strobe 300 has fired, in step S211, the camera 100 causes the rear curtain of the shutter 102 to travel under the control of the camera microcomputer 104 as per the rear curtain travel start time notification (step S209).

Then, in step S212, the image sensor 101 is controlled to switch from an accumulation state to a readout state, and the readout of shot image data is started. At the same time, in step S213, the strobe 300 is notified, through the transmitter 500, that a camera shooting sequence in strobe synchronized shooting is complete. The strobe 300 also returns an indication that the strobe has fired normally.

In this manner, the camera shooting sequence ends, and the camera 100 returns to an idle state.

Operations performed by the transmitter 500 will be described next with reference to FIG. 8.

In step S301, in a state where a wireless communication system constituted by the transmitter 500 and the strobe 300 has been started, the transmitter 500 issues a beacon packet every one second to establish communication with the strobe 300. Setting the interval at which the beacon packets are issued to a comparatively long time of one second makes it possible to reduce the frequency of reception operations performed by the wireless circuit 303 of the strobe 300. This in turn makes it possible to reduce the power consumption of the strobe 300.

In step S302, the transmitter 500 receives a notification that the switch SW2 of the camera 100 has turned on, i.e., an instruction to obtain the charging information of the strobe 300, and a firing sequence is then started. "Firing sequence" refers to a series of operations by the transmitter 500, including communication between the transmitter 500 and the strobe 300 during a period leading up to the strobe firing, which is started in response to the shooting start instruction from the camera 100, i.e., in response to the switch SW2 turning on (step S203).

In step S303, having received a notification that the switch SW2 has turned on, the transmitter 500 stops (suspends) the issuing of the beacon packets.

In step S304, the transmitter microcomputer 502 starts counting the time for which the beacons are stopped.

In step S305, the transmitter 500 queries the strobe 300 for the charging information through wireless communication, on the basis of the instruction to obtain the charging information, indicating the charging state of the strobe 300, from the camera 100 (step S204). Once the strobe 300 returns the charging information (step S402; see FIG. 9), the transmitter 500 returns the charging information of the strobe to the camera 100 through the connection unit.

Next, in step S306, the transmitter 500 receives the notification of the setting of the emitted light amount, made in step S207, from the camera 100, and sends the emitted light amount setting value to the strobe 300 through wireless communication. Communication indicating that the emitted light amount setting has been correctly received is then received from the strobe 300.

In step S307, the transmitter microcomputer 502 determines whether or not the time for which the beacons have been stopped, the counting of which started in step S304, is greater than or equal to a predetermined amount of time. The predetermined amount of time is set to an amount of time at which the wireless network will not be cut off due to the beacons being stopped during the exposure period (i.e., the connection will be maintained). For example, if the wireless network is set to be cut off after five seconds, the predetermined amount of time is set to four seconds.

When the beacons have been stopped for greater than or equal to the predetermined amount of time in step S307, in step S308, the transmitter 500 suspends the firing sequence and resumes issuing the beacon packets.

In step S309, the notification of the setting of the firing trigger, made in step S210, is received from the camera 100, and in step S310, the transmitter 500 stops issuing the beacon packets and resumes the firing sequence.

In step S311, the transmitter 500 sequentially sends a plurality of firing triggers, including the timing information, to the strobe 300, and varies the timing information included in each firing trigger in accordance with the order of the sending. Of the plurality of firing triggers sent sequentially from the transmitter 500, the strobe 300 fires in accordance with the timing information included in the first firing trigger which has been successfully received. As soon as any one firing command packet is received, the remaining firing command packets no longer need to be received, and the reception operations of the strobe 300 are therefore ended.

When, in step S307, the time for which the beacons are stopped is less than the predetermined time, the sequence moves to step S314. In step S314, the notification of the setting of the firing trigger, made in step S210, is received from the camera 100 before resuming the beacons. The beacons are not yet resumed, and thus the sequence moves directly to step S311.

In step S312, the notification that the camera shooting sequence has ended, made in step S213, is received from the camera 100, and the transmitter 500 notifies the strobe 300 of the end of the camera shooting sequence through wireless communication. Next, an Ack signal indicating whether or not the strobe 300 has fired normally is received from the strobe 300, after which the camera is notified and the firing sequence is ended.

In step S313, the transmitter 500 resumes the operations of periodically issuing beacon packets every one second, and returns to an idle state of standing by for the switch SW2 to turn on.

The operations performed by the strobe 300 will be described next with reference to FIG. 9. These operations start upon the wireless communication system constituted by the transmitter 500 and the strobe 300 starting.

In step S401, the strobe 300 continuously receives the beacon packets sent from the transmitter 500 to ensure that the communication is not cut off.

In step S402, the transmitter 500 queries the strobe 300 for the charging information through wireless communication, after which the strobe microcomputer 302 checks the charging information of the strobe 300 itself and returns the charging information to the transmitter 500.

In step S403, a notification of the emitted light amount is received from the camera 100 through wireless communication by the transmitter 500.

In step S404, the strobe 300 receives a firing command from the camera 100 through wireless communication by the transmitter 500. The strobe 300 performs control for main firing as soon as this reception is complete.

In receiving this firing command, unlike normal communication, after receiving the emission command packet, the strobe 300 does not return an Ack packet to the camera 100 in order to prepare for the main firing and avoid performing any unnecessary operations. However, the Ack packet may be returned. Returning the Ack packet stops the camera 100 from sending subsequent firing command packets, which makes it possible to cut down on wasteful wireless communication.

In step S405, of the plurality of firing command packets sent by the transmitter 500, the first packet that was received is analyzed, and the timing of the main firing is controlled by changing a clock count number in accordance with the timing information included in that packet. Regardless of which packet is ultimately received, the strobe 300 can perform the main firing at the same timing, and thus the camera 100 and the strobe 300 can be synchronized at a precise timing.

In step S406, the strobe 300 receives a notification of the end of the shooting sequence from the camera 100 through the transmitter 500, and sends an Ack packet indicating that the firing has ended normally.

Figure 10:
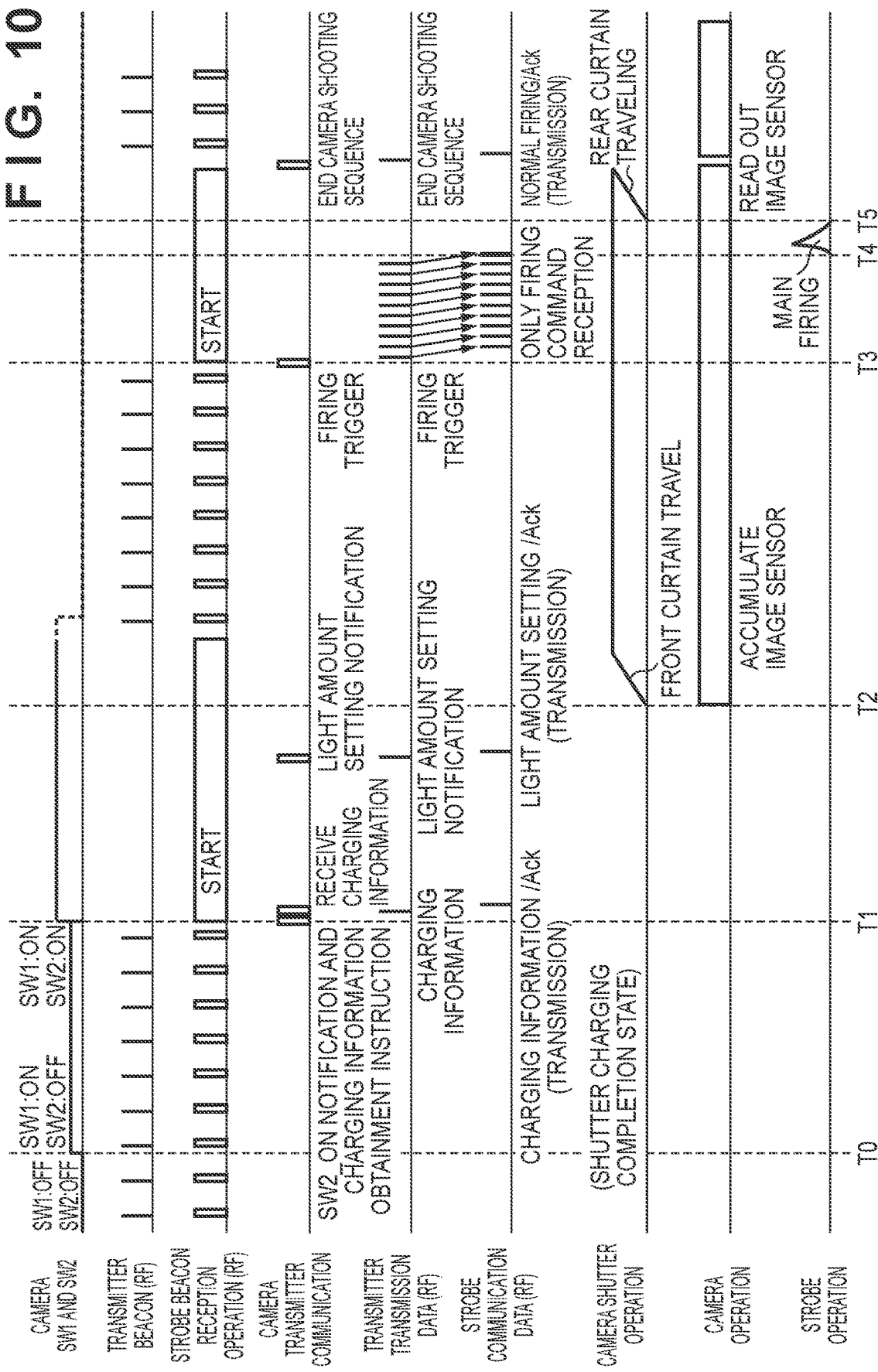
FIG. 10 is a timing chart corresponding to the flowcharts in FIGS. 7 to 9.

FIG. 10 is a diagram illustrating the operations in the flowcharts of FIGS. 7, 8, and 9 in timing chart format. These operations are assumed to start from a state in which the wireless communication system constituted by the transmitter 500 and the strobe 300 is started.

The transmitter 500 issues a beacon packet every one second. In accordance with this, the strobe 300 controls the wireless circuit 303 to perform reception operations every one second so that the beacon packets can be continuously received. It takes several milliseconds to receive a beacon packet, and particularly in the idle state where there is no need to communicate, the wireless circuit 303 on the strobe side does not need to operate from the end of the receiving operation until the next receiving operation, which makes it possible to conserve energy (Start to T0).

When the switch SW1 turns on (T0), the camera 100 adjusts the focus (step S202).

When the switch SW2 of the camera 100 turns on (step S203), the transmitter 500 detects that the switch SW2 has turned on through the external accessory attachment part 111, and stops the issuing of beacon packets (T1). Next, the transmitter 500 sends a packet requesting the charging information to the strobe 300. The strobe 300 checks its own charging state, and if the strobe 300 is in a state where firing is possible, the strobe 300 notifies the transmitter 500 to that effect. The charging information of the strobe 300 is then transmitted to the camera 100 through the transmitter 500. The strobe 300 is also set to a state in which wireless packets can always be received.

After entering this state, the camera 100 sends a light amount notification for the strobe firing, set in advance, to the strobe 300 via the transmitter 500, using wireless communication. Then, when rear curtain synchronous firing is set, the firing sequence of the transmitter 500 is temporarily suspended, and the issuing of the beacon packets is resumed.

Next, the camera 100 causes the front curtain of the shutter 102 to begin traveling (T2), and controls the image sensor 101 to enter the accumulation state (step S208).

Once the rear curtain travel time is near, a rear curtain travel start time notification is made within the camera 100, and the camera 100 makes a firing trigger setting notification to the transmitter 500 (T3). Upon receiving the firing trigger notification from the camera 100, the transmitter 500 stops the issuing of the beacon packets in order to resume the firing sequence (step S310), and sends a firing countdown to the strobe 300.

If the strobe 300 can receive any one of the plurality of firing command packets from the transmitter 500, the strobe 300 performs the main firing. As soon as any one firing command packet is received, the remaining firing command packets no longer need to be received, and the reception operations of the strobe 300 are therefore ended.

The camera microcomputer 104 causes the strobe 300 to fire on the basis of the firing timing communicated by the last firing command sent to the strobe 300 (T4), and causes the rear curtain of the shutter 102 to travel using the shutter drive unit 106 (T5). The exposure of the image sensor 101 ends as a result. Note that in order to reliably end the exposure after the strobe 300 has fired, the camera may cause the rear curtain to start traveling after receiving a response from the strobe 300 indicating that the firing has ended.

Then, when the travel of the rear curtain of the shutter 102 is complete, the image sensor 101 is controlled to switch from the accumulation state to the readout state, and the readout of image data is started. At the same time, a packet indicating that the camera shooting sequence has ended is sent to the strobe 300 through the transmitter 500. When the strobe 300 has received the firing command packet and fired successfully, the camera 100 is notified to that effect. The camera 100 determines that the image shot now is an image shot when the strobe has fired normally, adds an indication to that effect to the image data as information on shooting conditions, and records the resulting data as an image file. Conversely, if the strobe shooting could not be performed normally, an indication to that effect is added to the image data, and the data is recorded as an image file.

Once the camera shooting sequence has ended in this manner, the camera 100 and the strobe 300 return to the idle state of standing by for the switch SW1 to turn on. In other words, the transmitter 500 once again periodically issues the beacon packets every one second, and the strobe 300 correspondingly operates the wireless circuit 303 to receive the packets in one-second intervals.

As described thus far, according to the present embodiment, when shooting using rear curtain synchronous firing, the transmitter 500 stops, resumes, and re-stops the issuing of beacon packets in conjunction with the operations in the firing sequence, and issues the beacon packets until immediately before the rear curtain travels. By operating the wireless circuit 303 to receive the packets in response, the strobe 300 can maintain a wireless communication system with the transmitter 500 even during long exposure times, which makes it possible for the wireless strobe 300 to perform rear curtain synchronous firing.

Additionally, when beacon packets and firing commands are issued simultaneously, there has been a risk of the beacon packets interrupting the reception of the firing command packets, which is to be prioritized in the strobe 300 receiving the packets, and causing a shift in the firing timing. However, by stopping the beacons immediately before the rear curtain travels and only issuing the firing command packets, the strobe 300 can be caused to fire in synchronization with the rear curtain at a reliable timing.

Although the embodiment assumes that a shutter having mechanical front and rear curtains is used, the front curtain may be configured as a rolling shutter (electronic front curtain) in which the accumulation of the image sensor is started on a line-by-line basis. Alternatively, instead of the front and rear curtains, a global electronic shutter in which the start and end of accumulation are controlled digitally may be used.

Second Embodiment

The present second embodiment will describe rear curtain synchronous firing control performed in bulb shooting. In the second embodiment, only the operations of the camera 100 (the camera microcomputer 104) are different from the first embodiment, and thus the configurations of the camera 100, the transmitter 500, and the strobe 300 will not be described.

Operations of the camera 100, when the shooting mode of the camera 100 is the bulb shooting mode and the strobe 300 is caused to fire in the rear curtain synchronous firing control (step S104 in FIG. 6), will be described with reference to the flowchart in FIG. 11. In the rear curtain synchronized firing control in the bulb mode according to the present embodiment, the user can complete the shooting at any desired timing, and therefore the camera microcomputer 104 cannot know the timing at which the shooting will be complete beforehand. The descriptions will therefore assume that it is not possible to automatically adjust the light emission, and the user manually sets the emitted light amount, aperture value, ISO sensitivity, and so on before the bulb shooting.

Figure 11:
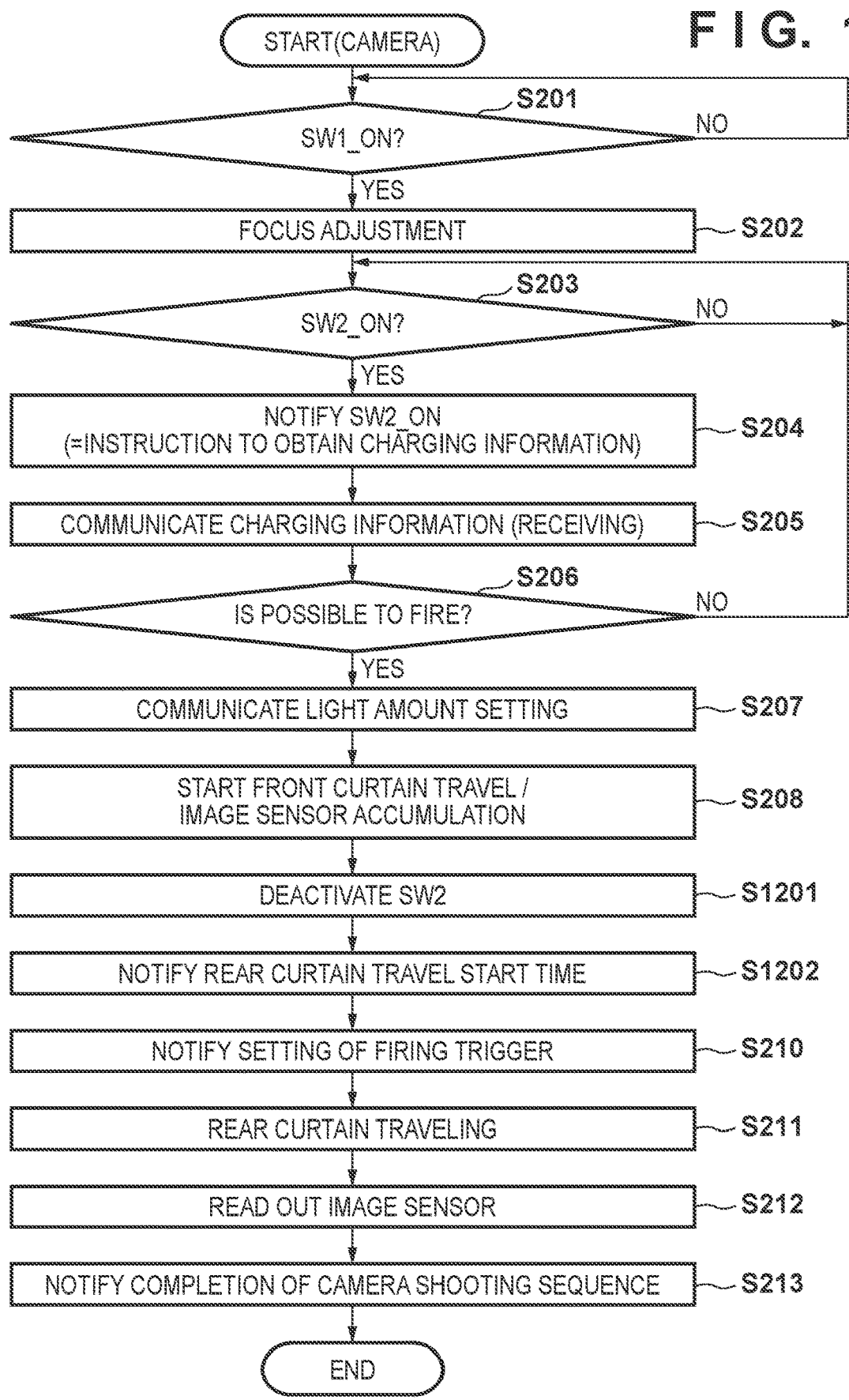
FIG. 11 is a flowchart illustrating rear curtain synchronous firing/shooting operations performed by the camera, according to a second embodiment.

In FIG. 11, steps in which the same operations as in the first embodiment are performed are given the same reference numerals as those in FIG. 7, and will not be described here. Furthermore, in the present embodiment, the processing from step S201 to step S208 is the same as the processing from step S201 to step S208 in the first embodiment, and will therefore not be described.

As in the first embodiment, in step S208, under the control of the camera microcomputer 104, the camera 100 controls the aperture stop 207 to cause the front curtain of the shutter 102 to begin traveling, and controls the image sensor 101 to begin accumulation. However, in bulb mode, the end of shooting is determined by the photographer, and thus at this point in time, the timing at which the shooting ends is unknown from the perspective of the camera 100.

Next, in step S1201, the switch SW2 of the camera 100 is deactivated. In bulb mode, the deactivation of the switch SW2 serves as the timing for making a notification of the rear curtain travel start time, and in step S1202, a notification of the rear curtain travel start time is made in the camera. The rear curtain travel start time is determined by calculating the processing time required before the rear curtain travels, taking into account the processing time of the firmware in the camera and the time from when the firing instruction is made by the camera to when the firing of the strobe 300 ends. Note that the shutter speed Tv value is not included in this calculation.

The subsequent operations from step S210 to step S213 are the same as step S210 to step S213 in the first embodiment, and will therefore not be described.

The operations of the transmitter 500 and the strobe 300 during bulb shooting are the same as when not performing bulb shooting.

FIG. 12 is a diagram illustrating the flowcharts of FIGS. 8, 9, and 11 in timing chart format. Processing parts that are the same as in the first embodiment will not be described.

The camera 100 causes the front curtain of the shutter 102 to begin traveling (T2), and controls the image sensor 101 to enter the accumulation state (step S208).

When the user deactivates the switch SW2 to end the shooting, the rear curtain travel start time notification is made within the camera at the same time (step S1201, T3').

When the rear curtain travel start time notification is made, the camera 100 makes a firing trigger setting notification to the transmitter 500 at the same time. Upon receiving the firing trigger notification from the camera 100, the transmitter 500 stops the issuing of the beacons in order to resume the firing sequence (step S310), and sends a firing countdown to the strobe 300. The subsequent operations are the same as the processing in the first embodiment.

The first and second embodiments describe a wireless strobe system in which the transmitter 500 serves as the master and the strobe 300 serves as the slave. However, the system may instead be a wireless strobe system in which a strobe attached directly to the camera 100 serves as a master, and the strobe 300 can be controlled as a slave.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-041220, filed Mar. 10, 2020 which is hereby incorporated by reference herein in its entirety.

What is claimed is:

1. A control apparatus that controls a strobe to fire in synchronization with an end of an exposure period of an image capturing apparatus, the control apparatus comprising:
   a wireless communication device that communicates wirelessly with the strobe; and
   a controller that controls the wireless communication device,
   wherein the wireless communication device periodically sends a signal for maintaining communication with the strobe during the exposure period of the image capturing apparatus,
   wherein the wireless communication device stops the signal, then sends a firing trigger signal to the strobe immediately before the exposure period ends.

2. The control apparatus according to claim 1,
   wherein the wireless communication device sends the signal before the exposure period starts, suspends the signal after a state in which communication with the strobe is possible has been established, and resumes sending the signal after the exposure period has started.

3. The control apparatus according to claim 2,
   wherein the wireless communication device resumes sending the signal when the exposure period is longer than a predetermined time.

4. The control apparatus according to claim 1,
   wherein the controller controls a timing at which the signal is suspended on the basis of a notification from the image capturing apparatus.

5. The control apparatus according to claim 1,
   wherein the controller sets a timing at which the signal is stopped before the exposure period ends on the basis of a shutter speed value set in the image capturing apparatus.

6. The control apparatus according to claim 1,
   wherein the controller sets a timing at which the signal is stopped before the exposure period ends on the basis of a timing at which a release switch of the image capturing apparatus is deactivated.

7. The control apparatus according to claim 1,
   wherein the signal is a beacon signal.

8. The control apparatus according to claim 1,
   wherein the control apparatus is a transmitter connected to a hot shoe of the image capturing apparatus.

9. The control apparatus according to claim 8,
   wherein the transmitter includes a light-emitting unit and functions as a master strobe, and controls the strobe as a slave strobe.

10. An image capturing apparatus comprising a control apparatus that controls a strobe to fire in synchronization with an end of an exposure period of an image capturing apparatus,
    wherein the control apparatus comprises:
    a wireless communication device that communicates wirelessly with the strobe; and
    a controller that controls the wireless communication device,
    wherein the wireless communication device periodically sends a signal for maintaining communication with the strobe during the exposure period of the image capturing apparatus,
    wherein the wireless communication device stops the signal, then sends a firing trigger signal to the strobe immediately before the exposure period ends.

11. A control method of controlling a strobe to fire in synchronization with an end of an exposure period of an image capturing apparatus, the method comprising:
    communicating wirelessly with the strobe; and
    controlling the wireless communication,
    wherein in the wireless communication, a signal for maintaining communication with the strobe is periodically sent during the exposure period of the image capturing apparatus, and
    wherein in the wireless communication, immediately before the exposure period ends, the signal is stopped, then a firing trigger signal is sent to the strobe.

12. A computer-readable storage medium in which is stored a program that causes a computer to execute a control method of controlling a strobe to fire in synchronization with an end of an exposure period of an image capturing apparatus, the method comprising:
    communicating wirelessly with the strobe; and
    controlling the wireless communication,
    wherein in the wireless communication, a signal for maintaining communication with the strobe is periodically sent during the exposure period of the image capturing apparatus, and
    wherein in the wireless communication, immediately before the exposure period ends, the signal is stopped, then a firing trigger signal is sent to the strobe.

* * * * *